United States Patent
Nkansah et al.

[11] Patent Number: 5,814,374
[45] Date of Patent: Sep. 29, 1998

[54] LOW VOC AQUEOUS COATING COMPOSITION

[75] Inventors: Asare Nkansah, Lansdale; Stewart Orlyn Williams, Hatfield; Richard Foster Merritt, Fort Washington, all of Pa.

[73] Assignee: Rohm and Haas Company, Philadelphia, Pa.

[21] Appl. No.: 666,107

[22] Filed: Jun. 19, 1996

[51] Int. Cl.$^6$ ........................................ B05D 3/02
[52] U.S. Cl. ...................... 427/386; 427/385.5; 427/391; 427/393; 427/393.6; 525/57; 428/423.3; 428/424.2; 428/423.1; 428/501; 428/514; 428/520; 523/201; 523/403; 523/407; 524/459 524/503; 524/557; 524/803
[58] Field of Search .................... 524/503, 459, 524/557, 803; 427/386, 385.5, 391, 393, 393.6; 428/423.3, 424.2, 423.1, 501, 514, 520; 523/201, 403, 407; 525/57

[56] References Cited

U.S. PATENT DOCUMENTS

| | | | |
|---|---|---|---|
| 3,549,578 | 12/1970 | Ehmann | 524/459 |
| 3,634,349 | 1/1972 | Goi et al. | 524/503 X |
| 3,755,234 | 8/1973 | Chujo et al. | 524/459 |
| 3,914,017 | 10/1975 | Bedell et al. | 524/459 X |
| 3,931,088 | 1/1976 | Sakurada et al. | 524/555 X |
| 4,118,357 | 10/1978 | Brabetz et al. | 524/503 |
| 4,169,088 | 9/1979 | Hansen | 524/503 |
| 4,539,362 | 9/1985 | Davies et al. | 524/459 X |
| 5,100,949 | 3/1992 | Takahashi et al. | 524/503 X |
| 5,155,189 | 10/1992 | Skillicorn et al. | 526/202 X |
| 5,200,458 | 4/1993 | Iwasaki et al. | 524/503 X |
| 5,212,228 | 5/1993 | Sistrunk | 524/503 X |
| 5,270,380 | 12/1993 | Adamson et al. | 524/556 |
| 5,296,532 | 3/1994 | Haerzschel et al. | 524/503 X |
| 5,308,910 | 5/1994 | Yuki et al. | 524/503 |
| 5,354,803 | 10/1994 | Dragner et al. | 524/503 |
| 5,387,638 | 2/1995 | Nakamue et al. | 524/503 |

*Primary Examiner*—Judy M. Reddick
*Attorney, Agent, or Firm*—Kevin F. Gironda; Ronald D. Bakule

[57] ABSTRACT

An aqueous coating composition having low VOC is provided. The invention provides excellent hardness and resistance properties in films formed from binders having glass transition temperatures below ambient temperature. The improvement in film properties comes from the binding of functionalized polyvinyl alcohol to a complementary functionalized latex binder. The low VOC compositions of this invention are useful for a variety of coatings including paints, stains, varnishes, mastics and adhesives.

7 Claims, No Drawings

LOW VOC AQUEOUS COATING COMPOSITION

The present invention relates to an aqueous coating composition having low volatile organic compounds (VOC). Aqueous coating compositions having low VOC are desirable due to concern about the odor, toxicity and environmental issues of volatile organic compounds. Aqueous coating compositions of this invention are useful in applications where hardness and resistance properties are desired, such as paints, stains, varnishes, adhesives and mastics.

Aqueous coating compositions contain polymer binders which must be hard enough to resist physical and chemical forces, but, at the same time, soft enough to form a continuous film. Film durability, water resistance and chemical resistance are provided by hard polymer binders with glass transition temperatures (Tg) above ambient temperature. However, to be film-forming, the polymer binder must have a Minimum Film Formation Temperature (MFFT) at or below the ambient temperature, to allow for fusion of the polymer particles into a continuous film.

U.S. Pat. No. 5,270,380 discloses two means for providing hard polymer films from coating compositions having an MFFT below ambient temperature. One method involves the addition of a coalescent to the coating composition. Volatile organic compounds, such as coalescent, temporarily lower the MFFT of a polymer binder, allowing the coating composition to form a continuous film at a temperature below the polymer Tg. Following evaporation of the volatile organic compound, the resultant film exhibits the properties associated with the polymer Tg, which is above ambient temperature. A second disclosed means for obtaining a hard polymer film from a low MFFT coating composition involves the use of a low Tg polymer binder having crosslinkable functional groups, such as acetoacetate. The polymer binder forms a continuous film, having a Tg below ambient temperature, while the functional groups form crosslinks during film formation to produce film properties similar to those of higher Tg polymers.

The problem with coating compositions containing either coalescent or crosslinkable polymers is that 1) coalescents are undesirable volatile organic compounds which raise odor, toxicity and environmental concerns; and 2) crosslinking polymer compositions are slow to exhibit final film properties, and produce films with inferior hardness properties.

We have found that polyvinyl alcohol, intentionally attached to a latex polymer binder, produces films with excellent hardness and resistance properties from coating compositions having binders with Tgs at or below ambient temperature. This invention allows for the formulation of a useful coating composition having little or no volatile organic compounds.

In a first aspect of the present invention, there is provided an aqueous, film-forming coating composition comprising at least one latex polymer binder covalently grafted with polyvinyl alcohol; said latex polymer binder having a glass transition temperature (Tg) in the range of from −35° C. to +30° C. and having a first reactable group; said polyvinyl alcohol having a second reactable group which is complementary to the first reactable group in the latex polymer binder; said coating composition having less than two percent volatile organic compounds based on the dry weight of the polymer binder.

In a second aspect of the present invention, there is provided a method for providing increased hardness and resistance properties of a film formed from an aqueous coating composition having less than two percent volatile organic compounds based on the dry weight of the polymer binder, comprising:

a) blending at least one latex polymer binder with polyvinyl alcohol; said latex polymer binder having a glass transition temperature (Tg) in the range of from −35° C. to +30° C. and having a first reactable group; said polyvinyl alcohol having a second reactable group which is complementary to the first reactable group in the latex polymer binder;

b) applying said coating composition to a substrate; and c) drying said coating composition to form a film.

Both the polyvinyl alcohol (PVOH) and latex polymer binder of this invention have at least one complementary reactable group. "Reactable group", as used herein, means an atom or group of atoms attached to a carbon atom and whose presence as a unit imparts characteristic properties to the polymer. By "functionalized", we mean a compound having at least one reactable group. By "complementary", we mean that the polyvinyl alcohol and latex polymer become chemically attached, or bound by the reactive interaction of the respective reactable groups. This attachment is provided by covalent binding. Preferred reactive groups of this invention are beta-ketoester, aldehyde, amine, anhydride, isocyanate, epoxy and hydrazide. The first or second reactable group in each pair may be present in either the latex polymer or in the polyvinyl alcohol. The complementary reactable groups include, for example:

a) beta-ketoester-aldehyde
b) beta-ketoester-amine
c) amine-aldehyde
d) amine-isocyanate
e) amine-epoxy
f) amine-anhydride
g) aldehyde-hydrazide A preferred complementary reactable pair is a latex polymer binder having a beta-ketoester group and a polyvinyl alcohol that is terminated in either an aldehyde or amine. Most preferably, the beta-ketoester group on the latex polymer binder is acetoacetate, and the polyvinyl alcohol is aldehyde terminated.

The latex polymer binder useful in this invention can be a homopolymer, a copolymer or a mixture of such polymers. Polymers useful in this invention are those capable of forming a continuous film upon drying at ambient temperature. The latex polymer contains at least one polymeric component with a glass transition temperature between −35° C. and +30° C. as measured by differential scanning calorimetry (DSC). Preferably, the Tg of the polymer is in the range of from −20° C. to +25° C., and, most preferably, in the range of from −10° C. to +20° C.

The latex polymer binder may be made by conventional polymerization techniques well known in the art. A preferred method of making the latex polymer is by conventional emulsion polymerization. Latex polymers useful in the present invention are not limited to any particular particle size, shape or molecular weight. While not limited by particle size, a preferred embodiment of the invention is the use of latex polymers having particle sizes in the range of from 30 to 300 nanometers in diameter.

The latex polymer has at least one first reactable group and may contain more than one reactable group. The reactable group may be incorporated into the polymer by means of a functional monomer or may be present as a result of post-polymerization functionalization. Preferably, the latex binder has a beta-ketoester functionality, and, most preferably, an acetoacetate functionality. Examples of monomers useful for the introduction of acetoacetate functionality are acetoacetoxyethyl acrylate, acetoacetoxyethyl methacrylate (AAEM), acetoacetoxypropyl methacrylate (AAPM), allyl acetoacetate, acetoacetoxy methacrylate, and 2,3-di (acetoacetoxy) propyl methacrylate. While all levels of functionality are useful in this invention, a preferred level of beta-ketoester functional monomer is from 8% to 30% by weight based on the total weight of the polymer binder. In addition to binding with the polyvinyl alcohol, as embodied in the present invention, the beta-ketoester functionality may also participate in other reactions such as, for example, crosslinking.

The latex polymer binder may be formed from at least one ethylenically-unsaturated monomer such as, for example, alkyl acrylates and methacrylates where the alkyl group contains from one to eighteen carbon atoms; acrylamide or substituted acrylamides; styrene or substituted styrenes; butadiene; vinyl acetate or other vinyl esters; vinyl monomers such as vinyl chloride, vinylidene chloride, N-vinyl pyrrolidone; acrylonitrile or methacrylonitrile and ethylene. Low levels of copolymerizable ethylenically-unsaturated acid monomers, in the range of 0.1% to 10% may also be used. When a beta-ketoester functional monomer is incorporated into the polymer, it is preferable not to use other acetate functional monomers, such as vinyl acetate.

The film-forming latex polymer of this invention is a substantially thermoplastic, or substantially uncrosslinked, polymer when it is applied to a substrate. Low levels of deliberate or adventitious crosslinking may be present. It is important, however, that the quality of the film formation not be materially impaired by this crosslinking.

Polyvinyl alcohol may be functionalized by chemical reactions known in the art, resulting in a polyvinyl alcohol having at least one second reactable group. A preferred method for functionalizing the polyvinyl alcohol is by oxidative cleavage at the 1,2 glycol linkages by an oxidizing agent such as, for example, sodium periodate. The amount of cleavage, and thus the degree of functionality and molecular weight of the resultant aldehyde-terminated polyvinyl alcohol, is controlled by the relative amount of the oxidizing agent. A preferred molecular weight of the functionalized polyvinyl alcohol is in the range of from 400 to 5,000 as measured by GPC using a polyacrylic acid standard.

The functionalized latex polymer binder and functionalized polyvinyl alcohol, each having complementary reactable groups, may be combined in several ways in the aqueous coating composition. An aqueous coating can be formulated with the latex binder, and then the functionalized polyvinyl alcohol can be added to the aqueous coating. Preferably, the functionalized polyvinyl alcohol is combined first with the latex binder and blended at least 3 hours at room temperature until homogeneous. This blend is then formulated into the aqueous coating composition. The polyvinyl alcohol is combined with the latex polymer at a ratio of from 0.01 to 1 molar equivalent of the second reactable group based on the molar equivalents of the first reactable group on the latex binder. Preferably, the polyvinyl alcohol is present at a level of from 2% to 16% by weight based on total polymer solids and most preferably at about 12%.

A preferred embodiment of this invention is a coalescent-free aqueous coating composition. "Coalescent-free" as used herein means that the coating composition does not contain "volatile organic compounds" defined herein as organic compounds having a boiling point at atmospheric pressure of less than about 250 C. "Coalescent-free" composition is not to be taken as excluding compositions which contain very low levels of deliberately or adventitiously added volatile organic compounds such as, for example, volatile organic compounds incorporated in certain commercial initiator or surfactant compositions, volatile organic compounds formed during the polymerization reaction, and volatile organic compound impurities; in any event, the level of volatile organic compounds is less than about 2% by weight, based on the dry weight of the polymeric binder.

The aqueous coating composition is prepared by conventional paint making techniques which are well known in the coatings art. First, the pigment and other adjuvants are well-dispersed in an aqueous medium under high shear, such as is afforded by a Cowles® mixer. Then the latex polymer is added under low shear stirring along with other coating adjuvants as desired. The polyvinyl alcohol is preferably combined with the latex polymer prior to formulation into a coating, but may be added to the composition before or after the addition of the latex polymer. The aqueous coating composition may contain, in addition to the polymers, conventional coatings adjuvants such as, for example, pigment, emulsifiers, thickeners, humectants, fillers, curing agents, wetting agents, biocides, anti-foaming agents, colorants, waxes, and anti-oxidants. A small amount of coalescent and plasticizer may also be added. A preferred embodiment of the invention is a coating composition that is coalescent-free.

The substrates to which the coating composition of this invention may be applied include, for example, wood, plaster, cementitious substrates and previously primed or coated substrates. Preferred substrates are indoor and outdoor architectural substrates such as walls, ceilings and floors. The coating composition of this invention may be applied to a substrate by methods well known in the art of applying coatings such as, for example, air-assisted spray, airless spray, brush and roller. The coating is then dried, preferably at ambient temperature.

Test Methods

Minimum Film Forming Temperature (MFFT) is the minimum temperature at which the latex forms a continuous film, as evidenced by the visual lack of cracking or powdery appearance of the film. MFFT was measured using ASTM Test Method D2354. A 1.2 millimeter biaxially oriented polypropylene (Mylar) film was placed over an ICI Sheen MFFT Bar (SS-3300). After the Bar was equilibrated for about 20 minutes, the test aqueous coating composition was applied using a 75 micron film applicator. The film was then allowed to dry for about 90 minutes. After the film was dried, the film was scratched with a wood tongue depressor. MFFT is reported at the point of some resistance to the scratching. Visual MFFT is also noted as the bar temperature at which the film is still continuous and no discontinuity is evidenced by whitening, cracking or both.

Print resistance is the ability of a coating to resist the imprint of another surface placed upon it. Print resistance is a function of the hardness of the coating. Latex films were cast on aluminum panels using a drawdown block with a 0.127 millimeter (5 mil) opening. The coated panels were conditioned at 25° C. and 50% relative humidity for 1, 3, and 7 days respectively. A square 3.81 by 3.81 centimeters (1½ inch square) was cut from each panel. Onto the test panel was placed in order: a 3.81 by 3.81 centimeter (1½ inch) piece of cheese cloth (as supplied with 4 layers intact); a number 8 solid rubber stopper; and a 500 gram weight on top of the stopper. Each test panel, with weighted cheese cloth, was then placed in a 60° C. oven for 60 minutes. After 60 minutes, the samples were removed from the oven and the weights and stoppers removed. The panels were allowed to cool for about 30 minutes before the cheese cloth was removed. The latex film was then rated on a scale of from 0 to 10 based on the amount of cheese cloth impression remaining imprinted on the film surface, with ten being no impression and zero being a severe impression and complete failure.

MEK rub is a measure of chemical resistance of the latex film. A 10 mil (0.254 millimeter) film of the test latex was drawn on aluminum panels and allowed to dry at 25° C. and 50% relative humidity for 1, 5, 7 and 14 days. Rectangles of 5 by 10 centimeters were cut from these aluminum panels and placed on an Atlas a.a.t.c.c Crockmeter (Atlas Electric Devices, Model No. CM-5). A square of cheese cloth 5 by 5 centimeters was clipped onto the finger of the Crockmeter. The cheese cloth was then saturated with methyl ethyl ketone (MEK). The Crockmeter was turned on and allowed to move across the panel. MEK was reapplied to the cheesecloth as needed to keep it saturated. The test was discontinued when the film was completely dissolved across the panel. The number of strokes required for the complete dissolution was recorded.

Tack is a measure of the hardness of the film. A 0.127 millimeter (5 mil) film was cast on aluminum panels and conditioned for 1, 3, 7 and 14 days at 25° C. and 50% relative humidity. Following conditioning, the panels were placed on a flat surface. A Zappon Gauge Tack tester (Zappon Inc.) was then placed on the film surface. Weights were added to the tester gauge for 5 seconds, then removed and the tester was monitored for an additional 5 seconds. This procedure was repeated with additional weight until the film fails the test. Tack is defined as the maximum weight which, when applied and subsequently removed, results in the Zappon gauge falling over within 5 seconds. The test was repeated 3 times at different locations on the coated aluminum panel. The result was recorded as the average of the three measurements.

Water resistance was measured by an accelerated stress test. The formulated latex coating composition was drawn down on two aluminum panels using a 0.0762 millimeter (3 mil) applicator. The panels were cured for 2 and 24 hours, respectively, at 25° C. and 50% humidity. After curing, the panels were completely submerged in room temperature deionized water for 30 minutes. After 30 minutes, the panels were removed and blister size and density was measured using the ASTM D714 standards. Size is rated from 10 (no blistering) to 1 (>1.27 centimeter diameter blisters) and density designated as d (dense), md (medium dense), m (medium), f (few) and vf (very few).

Gloss of the latex film was measured by drawing down a 0.254 millimeter (10 mil) sample on black glass. The film was dried at 25° C. and 50% relative humidity for 24 hours. Gloss was then measured at an angle of reflection of 20 degrees, using a GLOSSGARD II Glossmeter (Hunter Associates Laboratory, Inc.) as per ASTM D523-89.

Particle sizes were measured by light scattering using a Brookhaven BI-90 Particle Sizer.

Latex Coating Composition Formulation

All testing was conducted on formulated coating compositions. Each latex polymer binder was formulated in the following manner prior to testing:

| | Ingredient Weight |
|---|---|
| Mix in a Cowles Mixer | |
| Dispersant (25% solids) | 57.2 |
| Surfactant | 8.64 |
| Surfactant | 2.00 |
| Defoamer | 1.00 |
| Biocide | 1.80 |
| Solvent-free thickener | 15.00 |
| Pigment (Titanium dioxide) | 215.94 |
| Let Down with | |
| Latex polymer binder (44.2% solids) (including PVOH if added) | 581.49 |
| Water (water level was adjusted based on latex solids to maintain PVC) | 94.73 |
| Defoamer | 1.00 |
| Solvent-free thickener | 34.0 |
| Organic titanate | 2.5 |
| Properties | |
| Volume % solids | 34.9 |
| Pigment Volume Concentration (PVC) | 18.5 |

Functionalization of Polyvinyl Alcohol

Functionalized polyvinyl alcohol was prepared as follows: To 600 grams of a 20% by weight solution of polyvinyl alcohol in water (Airvol® 203 by Air Products) was added 16.0 grams of sodium periodate. The mixture was stirred at room temperature for 3 hours to form an aldehyde-terminated (second reactable group) polyvinyl alcohol. This procedure produced aldehyde-terminated polyvinyl alcohol having a molecular weight of 700 as measured by GPC using a polyacrylic acid standard. Higher molecular weight aldehyde-terminated polyvinyl alcohol was also produced by the same procedure using 4.0 grams, rather than 16.0 grams, of the sodium periodate yielding functionalized polyvinyl alcohol with a molecular weight of 1,500.

EXAMPLE 1

Preparation of Sample 1 (Comparative)

A 45.8% solids latex emulsion was prepared by emulsion polymerization to produce a polymer binder having a monomer content of 39% butyl acrylate (BA), 50% methyl methacrylate (MMA), 9% acetoacetoxy ethyl methacrylate (AAEM) and 2% methacrylic acid (MAA). The acetoacetate from the AAEM being the first reactable group. No functionalized polyvinyl alcohol was added to this example. The polymer Tg was +33° C., as calculated from the Fox equation.

EXAMPLE 2

Preparation of Sample 2 (Comparative)

To 400 grams of the latex emulsion of Example 1 was added 115 grams of 20% by weight solution of aldehyde terminated polyvinyl alcohol (4 mole percent) with a molecular weight of 700, the aldehyde being the second reactable group. The mixture was stirred at room temperature for 6 hours to permit reaction between the aldehyde and acetoacetate groups.

EXAMPLE 3

Testing of Samples 1 and 2

Sample 1 and Sample 2, both comparative, were formulated in the Latex Coating Composition Formulation. The formulated coating compositions were drawn down on aluminum panels using a 0.0762 millimeter (3 mil) applicator and allowed to dry for 24 hours at 25° C. and 50% relative humidity. Both coatings were non-film-forming, showed severe cracking and flaked off the aluminum panel when touched. Because both coating compositions failed to form films, no film property testing could be performed. This example shows that compositions containing polymer binders with glass transition temperatures above ambient temperature, and without coalescent, do not form films and are not useful as coating compositions.

EXAMPLE 4

Preparation of Sample 3 (Comparative)

A 46.0 % solids latex emulsion was prepared by sequential emulsion polymerization to produce a binder having a 40% core polymer of 55% butyl acrylate (BA), 43.5% methyl methacrylate (MMA), 1% allyl methacrylate (ALMA) and 0.5% methacrylic acid (MAA); and a 60% shell polymer of 50% butyl acrylate (BA), 32.5% methyl methacrylate (MMA), 15% acetoacetoxy ethyl methacrylate (AAEM) and 2.5% methacrylic acid (MAA). The acetoacetate from the AAEM being the first reactable group. This example is a control, with no polyvinyl alcohol added.

EXAMPLE 5

Preparation of Sample 4

To 400 grams of the latex emulsion of Sample 3 was added 115.5 grams of 20% by weight solution of aldehyde terminated polyvinyl alcohol (4 mole percent) with a molecular weight of 700, the aldehyde being the second reactable group. The mixture was stirred at room temperature for 6 hours to permit reaction between the aldehyde and acetoacetate groups.

EXAMPLE 6

Preparation of Sample 5

To 400 grams of the latex emulsion of Sample 3 was added 115.5 grams of 20% by weight solution of aldehyde terminated polyvinyl alcohol (4 mole percent) with a molecular weight of 1,500. The mixture was stirred at room temperature for 6 hours to permit reaction between the aldehyde and acetoacetate groups.

EXAMPLE 7

Testing of Samples 3, 4 and 5

Samples 3, 4 and 5 were formulated in the Latex Coating Composition Formulation. Each formulated coating composition was then tested, with the results of the testing shown in Table 1.

TABLE 1

| | Sample | | |
|---|---|---|---|
| | 3 (comparative) | 4 (4% 700 MW) | 5 (4% 1,500 MW) |
| Particle size, nanometers | 125 | 120 | 127 |
| Tack (g) (1/14 days) | 50/400 | >1000 | >1000 |
| Print, 1 day | 5 | 9 | 8 |

This example shows that coating compositions of this invention to which functionalized complementary PVOH has been added show significantly improved film hardness, as measured by both Tack and Print. This improvement in Tack and Print is seen with both molecular weight functionalized polyvinyl alcohols tested.

EXAMPLE 8

Preparation of Sample 6 (Comparative)

A 45.86% solids latex emulsion was prepared by standard emulsion polymerization from 53.5% butyl acrylate (BA), 35.8% methyl methacrylate (MMA), 9% acetoacetoxy ethyl methacrylate (AAEM) and 1.7% methacrylic acid (MAA). The acetoacetate from the AAEM being the first reactable group. This example is a control, with no polyvinyl alcohol added.

EXAMPLE 9

Preparation of Sample 7

To 400 grams of the latex emulsion of Sample 4 was added 115 grams of 20% by weight solution of aldehyde terminated polyvinyl alcohol (4 mole percent) with a molecular weight of 700, the aldehyde being the second reactable group. The mixture was stirred at room temperature for 6 hours to permit reaction between the aldehyde and acetoacetate groups.

EXAMPLE 10

Testing of Samples 6 and 7

Samples 6 and 7 were formulated in the Latex Coating Composition Formulation. Each formulated coating composition was then tested, with the results of the testing listed in Table 2.

TABLE 2

| | Sample | |
|---|---|---|
| | 6 (comparative) | 7 (4% 700 MW) |
| Particle size, nanometers | 169 | 169 |
| MFFT, °C. | | |
| visual | <0 | <0 |
| mechanical | 7.8 | 7.9 |
| Print, 1/7 days | 2/3 | 5/6 |
| MEK rubs 1/5 days | 18/46 | 47/133 |
| Water Resistance | | |
| 2 hr dry | 5 d/2 d | 9 m/9 m |
| 1 day dry | 10/9 vf | 10/10 |

This example shows an increase in chemical resistance (MEK rubs) and water resistance in films formed from the aqueous coating compositions of this invention. The films of this invention also have increased hardness, as measured by an increase in print resistance.

EXAMPLE 11

Preparation of Sample 8 (Comparative)

A 40.92 latex emulsion was prepared by standard emulsion polymerization from 54.5% butyl acrylate (BA), 33.0% methyl methacrylate (MMA), 9% acetoacetoxy ethyl methacrylate (AAEM) and 3.5% methacrylic acid (MAA). The acetoacetate from the AAEM being the first reactable group. This example is a control, with no polyvinyl alcohol added.

EXAMPLE 12

Preparation of Sample 9

To 400 grams of the latex emulsion of Sample 8 was added 102.7 grams of 20% by weight solution of aldehyde terminated polyvinyl alcohol (4 mole percent) with a molecular weight of 700, the aldehyde being the second reactable group. The mixture was stirred at room temperature for 6 hours to permit reaction between the aldehyde and acetoacetate groups.

EXAMPLE 13

Preparation of Sample 10

To 400 grams of the latex emulsion of Sample 8 was added 102.7 grams of 20% by weight solution of aldehyde terminated polyvinyl alcohol (4 mole percent) with a molecular weight of 1,500. The mixture was stirred at room temperature for 6 hours to permit reaction between the aldehyde and acetoacetate groups.

EXAMPLE 14

Testing of Samples 8, 9 and 10

Samples 8, 9 and 10 were formulated in the Latex Coating Composition Formulation. Each formulated coating composition was then tested, with the results of the testing shown in Table 3.

TABLE 3

| | Sample | | |
| --- | --- | --- | --- |
| | 8 (comparative) | 9 (4% 700 MW) | 10 (4% 1,500 MW) |
| Particle size, nanometers | 92 | 92 | 92 |
| Gloss DD 20° | 54 | 55 | 53 |
| Tack (g) (1/5/7 days) | 20/<10/<10 | 150/<10/130 | 60/<10/90 |
| Print, 1/7 days | 5/6 | 7/8 | 8/9 |
| MEK rubs 1/5/7 days | 46/54/120 | 176/189/638 | 192/283/681 |
| Water Resistance | | | |
| 2 hr dry | 8 d/8 d | 9 m/9 m | 10/10 |
| 1 day dry | 9 vd/9 vd | 9 vf/9 vf | 10/9 vf |

The results of this testing show that coating compositions of the present invention result in films having an increase in chemical resistance (MEK rubs), water resistance and hardness, as seen in print resistance and tack, without a loss of gloss.

What is claimed is:

1. An aqueous, film-forming coating composition comprising at least one aqueous latex polymer binder covalently grafted with polyvinyl alcohol; said aqueous latex polymer binder having a glass transition temperature (Tg) in the range of from −35° C. to +30° C. and having a first reactable group selected from the group consisting of beta-ketoester, aldehyde, amine, anhydride, isocyanate, epoxy, and hydrazide; said polyvinyl alcohol having a second reactable group selected from the group consisting of beta-ketoester, aldehyde, amine, anhydride, isocyanate, epoxy, and hydrazide which is complementary to the first reactable group in the aqueous latex polymer binder; said coating composition having less than two percent volatile organic compounds based on the dry weight of the polymer binder.

2. The aqueous coating composition of claim 1 wherein the aqueous latex polymer binder has a glass transition temperature in the range of from −10° C. to +20° C.

3. The coating composition of claim 1 wherein the second reactable group is terminal aldehyde or terminal amine.

4. The aqueous coating composition of claim 1 wherein said polyvinyl alcohol is present at from 2% to 16% by weight based on the weight of the dry polymer binder.

5. A method for providing increased hardness and resistance properties of a film formed from an aqueous coating composition comprising:

a) blending at least one aqueous latex polymer binder with polyvinyl alcohol; said aqueous latex polymer binder having a glass transition temperature (Tg) in the range of from −35° C. to +30° C. and having a first reactable group selected from the group consisting of beta-ketoester, aldehyde, amine, anhydride, isocyanate, epoxy, and hydrazide said polyvinyl alcohol having a second reactable group selected from the group consisting of beta-ketoester, aldehyde, amine, anhydride, isocyanate, epoxy, and hydrazide which is complementary to the first reactable group in the aqueous latex polymer binder wherein said aqueous coating composition contains less than two percent volatile organic compounds based on the dry weight of the polymer binder;

b) applying said coating composition to a substrate; and c) drying said coating composition to form a film.

6. The method of claim 5 wherein the second reactable group on the polyvinyl alcohol is terminal aldehyde or terminal amine.

7. An architectural substrate coated with said aqueous coating composition of claim 1.

* * * * *